United States Patent
Painter et al.

(10) Patent No.: US 6,934,660 B2
(45) Date of Patent: Aug. 23, 2005

(54) MULTI STAGE CONTROL ARCHITECTURE FOR ERROR SUPPRESSION IN MICROMACHINED GYROSCOPES

(75) Inventors: Christopher C. Painter, Irvine, CA (US); Andrei M. Shkel, Irvine, CA (US)

(73) Assignee: The Regents of the University of California, Oakland, CA (US)

(*) Notice: Subject to any disclaimer, the term of this patent is extended or adjusted under 35 U.S.C. 154(b) by 0 days.

(21) Appl. No.: 10/370,650

(22) Filed: Feb. 20, 2003

(65) Prior Publication Data

US 2004/0199347 A1 Oct. 7, 2004

(51) Int. Cl.[7] ............................................... G06F 15/00
(52) U.S. Cl. ....................... 702/141; 702/142; 702/145; 702/150; 702/151; 73/504.02; 73/504.16; 73/504.12
(58) Field of Search ................................. 702/141, 142, 702/145, 150, 151, 182; 73/504.02, 504.16, 504.125, 511, 497; 701/220; 244/158 R, 164, 165, 17.13, 171, 176; 342/357.14

(56) References Cited

U.S. PATENT DOCUMENTS 6,522,992 B1 * 2/2003 McCall et al. .............. 702/141

* cited by examiner

Primary Examiner—Michael Nghiem
Assistant Examiner—Stephen J. Cherry
(74) Attorney, Agent, or Firm—Daniel L. Dawes; Myers Dawes Andras & Sherman LLP (57) ABSTRACT

Due to restrictive tolerancing, structural imperfections that reduce performance of fabricated micro gyroscopes are typical. While feedback control is normally used to compensate for these imperfections, there are limitations to how large of errors for which this strategy can compensate without interfering with the performance of the sensor. A multi stage control architecture comprising in situ self-diagnostic capabilities, electronic "trimming" of errors, and feedback control allows for the compensation of all magnitudes of errors without interfering with the performance of the device. The self-diagnostic capabilities include an algorithm for determining structural imperfections based on the dynamic response of the system. The feedforward portion of the control is used to "trim" large imperfections, while the feedback portion compensates for the remaining non-idealities and small perturbations. A control architecture is shown in a gyroscope using nonlinear electrostatic parallel plate actuation.

24 Claims, 9 Drawing Sheets

FIG. 2A
IDEAL GYROSCOPE

FIG. 2B
ANISOELASTICITY IN GYROSCOPE

MULTI STAGE CONTROL ARCHITECTURE FOR ERROR SUPPRESSION IN MICROMACHINED GYROSCOPES

BACKGROUND OF THE INVENTION

1. Field of the Invention

The invention relates to MEMs gyros and in particular to a method of suppressing errors.

2. Description of the Prior Art

As MEMS inertial sensors have begun to proliferate more into rate and tactical grade application markets, the current demand is for inertial sensors with higher precision and long term performance. Currently, there are no MEMS based gyroscopes on the market capable of navigation grade inertial sensing, mainly due to inadequate drift and noise performance that result in large attitude errors upon integration of rate signals to obtain orientation. One of the contributing factors to this degradation in gyroscope performance is structural imperfections as a result of tolerance errors in the fabrication of the device. As all MEMS devices are built using photolithographic processes, the relative tolerances are on the order of 10% or more. Currently, in order to operate with the highest precision, vibratory gyroscopes typically include active feedback control to compensate for fabrication imperfections. However, as will be illustrated in this disclosure, when imperfections are large compared to the measured Coriolis force, compensation cannot be achieved with a purely feedback control without interfering with the Coriolis measurements. These interferences cause scale factor and drift errors in the gyroscope, resulting in degraded performance. In these cases, both post processing such as laser trimming, ion beam milling or selective material deposition and feedback control are required. The disadvantage is that this type of post processing is done exclusively by the manufacturer, usually under ideal laboratory conditions. As a result, the end-user is still required to calibrate the device prior to use and then once the device is in use in the end-user's application, typically no additional calibration is possible.

With the continuing improvements of CMOS compatible MEMS processes, the prospect of enhanced microdevices capable of computationally intensive integrated control systems is fast becoming a reality. In light of this fact, the demand for improved inertial sensor performance gives rise to a new paradigm of "smart" devices with enhanced capabilities, such as active structural compensation, self-calibration, and signal processing integrated on the same chip. Under this new paradigm, what is needed is an alternative to the potentially costly and time consuming post processing of each individual device.

BRIEF SUMMARY OF THE INVENTION

The invention is a multi stage architecture that integrates self-calibrative capabilities for identication of errors, active electronic "trimming" in the form of a feedforward control for elimination of large structural imperfections, and feedback control for elimination of smaller perturbations. Such a control architecture signicantly reduces the time and cost for sensor calibration and potentially improves long term performance by allowing for rapid in-run diagnostics.

The invention is thus defined as a method for error suppression in a micromachined gyroscope comprising the steps of self-calibrating the gyroscope to identify structural errors based on the dynamic response of the system; actively trimming the gyroscope by using feedforward control in response to large structural imperfections based on the structural errors identified during the self-calibration; and eliminating small errors and in-run perturbations in the gyroscope by feedback control.

The step of self-calibrating the gyroscope to identify structural errors based on the dynamic response of the system comprises the step of using principal component analysis (PCA) and Fourier transforms to make the identification.

The step of actively trimming the gyroscope comprises the step of using electrostatic parallel plates to apply a feedforward error suppression signal to the gyroscope.

The step of eliminating small errors and in-run perturbations in the gyroscope comprises the step of using electrostatic parallel plates to apply a feedback error suppression signal to the gyroscope.

The step of self-calibrating the gyroscope to identify structural errors based on the dynamic response of the system comprises the steps of exciting the gyroscope with an initial impulse response and allowing it to freely oscillate; recording the x and y deflections of a sensing mass in the gyroscope; determining statistical variances $s^2_x$ and $S^2_y$ and covariances $s_{xy}$ for the x and y deflections and an angle of misalignment $\alpha$ by $$\alpha = \tan^{-1}\left\{\frac{2s_{xy}}{s_x^2 - s_y^2 + \sqrt{(s_x^2 - s_y^2)^2 + 4s_{xy}^2}}\right\}$$

transforming the x and y deflections to decoupled positions $q_1$ and $q_2$ using the transform $$q_1 = x\cos\alpha + y\sin\alpha$$

$$q_2 = -x\sin\alpha + y\cos\alpha$$

obtaining a frequency spectrum of the $q_1$ and $q_2$ positions by Fourier transforms; determining frequencies $\omega_{q1}$ and $\omega_{q2}$ corresponding to the highest deflections of $q_1$ and $q_2$, respectively, using a peak finding routine; and identifying anisoelasticity parameters $h$ and $k_n$ as $$h = \frac{m}{2}(\omega_{q1} - \omega_{q2})$$

$$k_n = \frac{m}{2}(\omega_{q1} + \omega_{q2}).$$

The step of actively trimming the gyroscope by using feedforward control comprises trimming large anisoelasticity of the stiffness of the gyroscope to an order where feedback control can compensate therefore.

The step of trimming comprises making a constant change in the stiffness based structural errors identified by self-calibrating the gyroscope.

The step of trimming comprises electrostatic tuning using a nonlinear "negative spring" effect inherent in electrostatic parallel plates to change the stiffness.

The gyroscope is characterized by a stiffness matrix $K = K_i + K_n + K_e$, where $(K_i)$ is the contribution from an ideal gyroscope, $(K_n)$ is the contribution from a non-ideal gyroscope, and $(K_e)$ is the contribution from the electrostatic negative spring. The step of trimming comprises applying electrostatic control voltages which maximize the trace of the stiffness matrix, K.

The step of eliminating small errors and in-run perturbations in the gyroscope by feedback control comprises the step of compensating for small perturbations without interfering with the Coriolis induced precession.

The step of compensating for small perturbations without interfering with the Coriolis induced precession comprises the step of driving undesirable ellipticity with the form $$\begin{Bmatrix} F_x \\ F_y \end{Bmatrix} = -\gamma_1 \cdot P \cdot S^T \cdot \begin{Bmatrix} x \\ y \end{Bmatrix}$$

where $F_x$ and $F_y$ are the driving forces in the x and y directions respectively, x and y are the planar positions of the driven mass of the gyroscope, $y_1$ is a constant gain, S is a unity gain 2×2 skew symmetric matrix, and P is angular momentum defined as $$P = (x\dot{y} - y\dot{x})$$

The invention also contemplates being defined as an apparatus for performing each of the steps in the combinations recited above. The apparatus may take the form of an on- or off-chip conventional digital processing circuit, either fixed in hardware and controlled as claimed by firmware or a general purpose software controlled computer.

While the apparatus and method has or will be described for the sake of grammatical fluidity with functional explanations, it is to be expressly understood that the claims, unless expressly formulated under 35 USC 112, are not to be construed as necessarily limited in any way by the construction of "means" or "steps" limitations, but are to be accorded the full scope of the meaning and equivalents of the definition provided by the claims under the judicial doctrine of equivalents, and in the case where the claims are expressly formulated under 35 USC 112 are to be accorded full statutory equivalents under 35 USC 112. The invention can be better visualized by turning now to the following drawings wherein like elements are referenced by like numerals.

BRIEF DESCRIPTION OF THE DRAWINGS

FIG. 1(b) is a graph of the y and x positons in the gyro of FIG. 1a. In rate integrating gyroscopes, there is ideally no input force Fd and the mass is initially in free oscillation along the x axis. The line of oscillation precesses with an input Coriolis force by an angle φ, which is proportional to the angular deflection

In FIG. 3(a) the presence of an input angular rotation, the line of oscillation of an ideal gyroscope would be observed to precess by an angle φ with respect to the rotating coordinate system. In FIG. 3(b) with small anisoelasticities, the line of oscillation is distrupted as it precesses. These anisoelasticities enter into the equations for the measured precession angle, causing degradation of performance.

In FIG. 3(c) large anisoelasticities are even more disruptive, completely eliminating precession.

FIG. 4 is a conceptual block diagram of the error correction system of the invention. Under the paradigm of "smart" MEMS gyroscopes, the invention is a multistage control architecture which consists of the following: (1) Self-calibrative capabilities for identifying structural errors, which includes a novel error finding algorithm designed by the inventors, (2) a feedforward control which "trims" large structural imperfections based on the structural nonidealities parameters identied during the self-calibration test, and (3) a feedback control which eliminates small errors and in-run perturbations.

FIG. 7(a) is an artist's depiction of a circular MEMs gyro. To demonstrate feasibility of the control architecture, simulation is run based on a design previously conceived by the inventors. The studied rate integrating gyroscope is comprised of a freely vibrating proof mass attached to a concentric six ring suspension. Stationary electrodes interwoven throughout the mass sustain motion and allow measurement of the Coriolis induced precession angle. The precession angle is proportional to the angle of rotation of the device. The simulation is run using parameters based on a realistic implementation of a surface machined rate integrating gyroscope, fabricated using JDS Uniphase's MUMPS process.

FIGS. 8(a)–8(f) are graphs of the Y position verses the X position of the gyro. In the absence of imperfections, the line of oscillation precesses normally by angle φ in FIG. 8(a) in the presence of an input angular rotation.

The invention and its various embodiments can now be better understood by turning to the following detailed description of the preferred embodiments which are presented as illustrated examples of the invention defined in the claims. It is expressly understood that the invention as defined by the claims may be broader than the illustrated embodiments described below.

DETAILED DESCRIPTION OF THE PREFERRED EMBODIMENTS

Gyroscope Principles

All micromachined gyroscopes are vibratory in nature, measuring either angular rates by detecting energy coupled between orthogonal vibration modes due to Coriolis force or angle of rotation through the precession of an oscillation pattern. In a rate gyroscope, a structural element is forced into oscillation in one principle structural mode, designated the "drive" mode. The presence of rotation induced Coriolis force couples the sustained oscillation into an orthogonal structural mode, designated the "sense" mode. The magnitude of vibration induced in the sense mode is proportional to the rotation rate of the device.

Figure 1A:
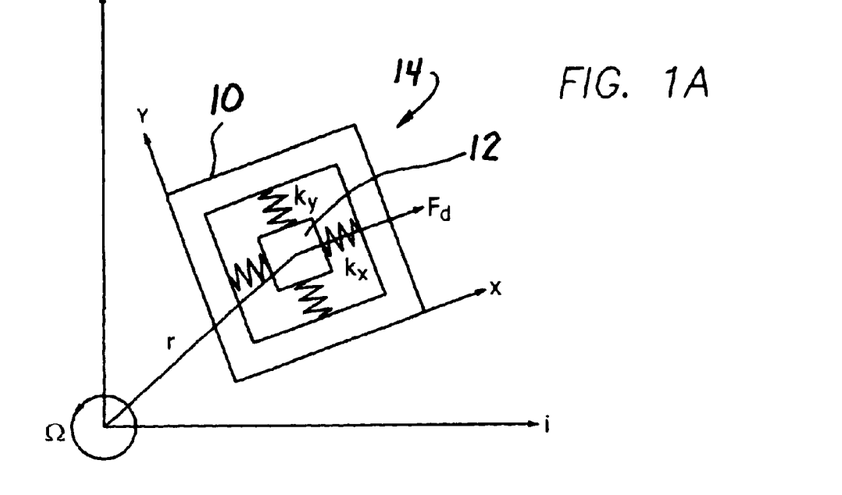
FIG. 1(a) is a block diageram of the dynamic system of a micromachined vibratory gyroscope. In a rate gyroscope, device is constantly driven with an input sinusoidal force along the x direction and motion-proportional to input angular rate is measured along the y direction.
Figure 1B:
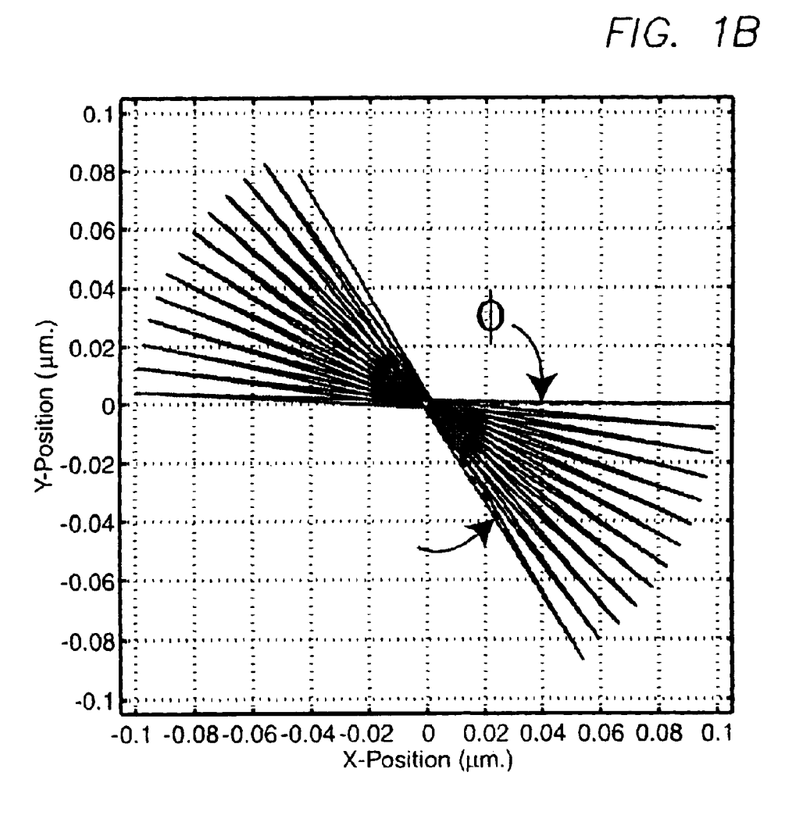

In a rate integrating gyroscope, the structural element is sustained in free oscillation and the presence of Coriolis force causes precession of the oscillation pattern, which is proportional to the angle of rotation of the gyro. As an illustration, consider a structural mass 12 attached to a frame 10 free to move in inertial space (i,j) as diagrammatic shown in FIG. 1. In the coordinate frame (X,Y) of the moving device or mass 12, the equations of motion, assuming the operating frequency is much greater than the rotation rate are $$m\ddot{x}+k_x x-2m\Omega\dot{y}=F_d(t) \quad (1)$$

$$m\ddot{y}+k_y y+2m\Omega\dot{x}=0 \quad (2)$$

where m is the lumped mass of the system, $k_x$ and $k_y$ are the x and y stiffness values, respectively, and $\Omega$ is an input angular rate. To achieve highest sensitivity, the stiffnesses between x and y in rate gyroscopes are typically designed to be the same ($k_x=k_y=k$) and the system is driven at its resonant frequency using a harmonic excitation force $F_d$ (where $F_d=F_0 \sin \omega_n t$ and $$\omega_n = \sqrt{\frac{k}{m}} ).$$

The measured sense acceleration $a_c$ is proportional to the input angular velocity $$a_c \sim \Omega X_0 \omega_n \cos \omega_n t \quad (3)$$

where $X_0$ is the magnitude of vibration in the x direction. In rate integrating gyroscopes, the drive force is zero ($F_d=0$) and the system is ideally freely oscillating (energy compensation is necessary in an actual device to compensate for damping losses). Under the assumption that an input angular velocity is much less than the oscillation frequency, the line of oscillation will precess by an angle $\phi$ which is equal to the negative angle of rotation. The angle can be directly identified by $$\tan 2\phi = \frac{2(\omega_n^2 xy + \dot{x}\dot{y})}{\omega_n^2(x^2-y^2)+(\dot{x}^2-\dot{y}^2)} \quad (4)$$

In this previous section, we have assumed the operation of an ideal device that has isotropic stiffness (stiffness identical in x and y). However, in every fabricated device, there is some level of imperfections which cause deviations from the ideal stiffness values, or anisoelasticities.

Anisoelasticity

Figure 2A:
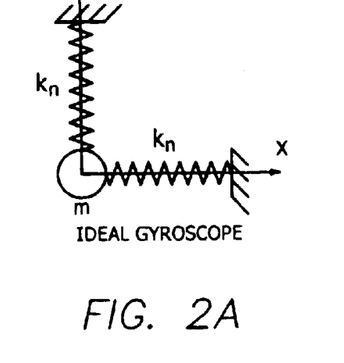
FIG. 2a is a diagram of an ideal gyroscope, where the principal axes of elasticity have equal stiffness ($k_n$) and coincide with the x-y coordinate system. In the presence of imperfections, there is a mismatch in the principal stiffness values, $2h = (K_1 - K_2)$ and an angular mismatch of the principal axes from the x-y coordinate system by an angle α.
Figure 2B:
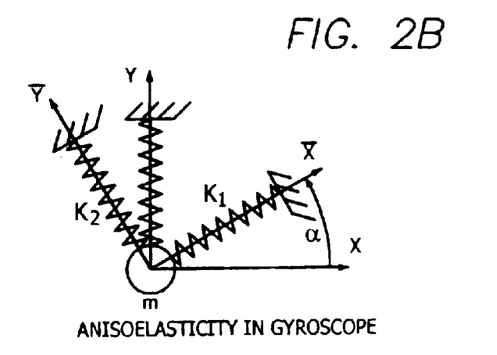
Figure 3A:
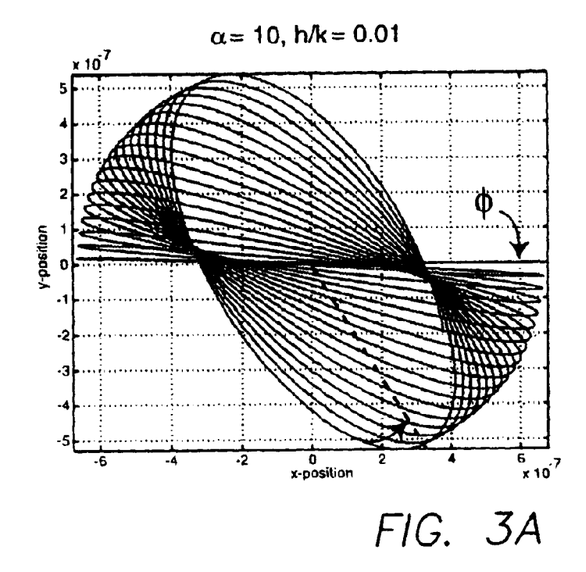
FIGS. 3(a)–3(d) are graphs of the y position relative to the x position.
Figure 3B:
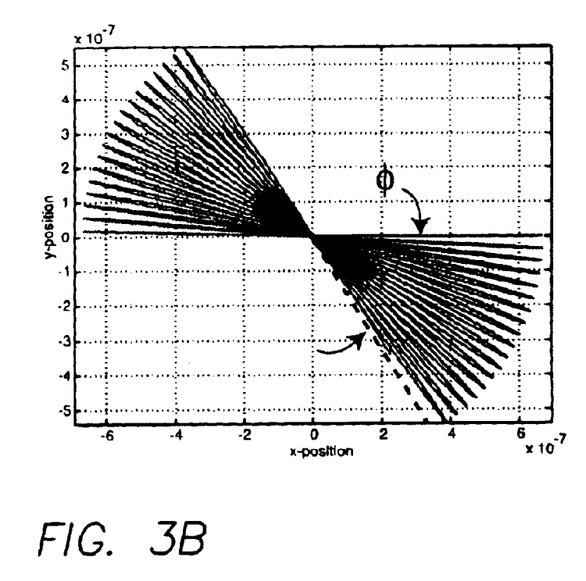
Figure 3C:
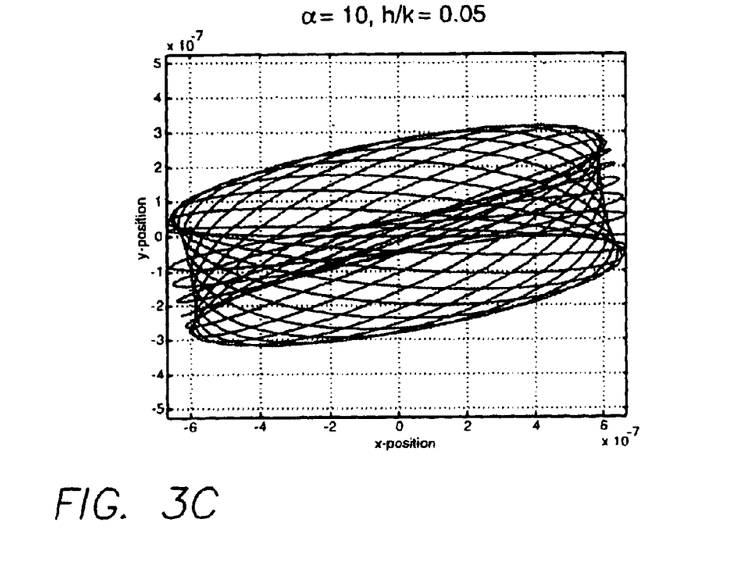
Figure 3D:
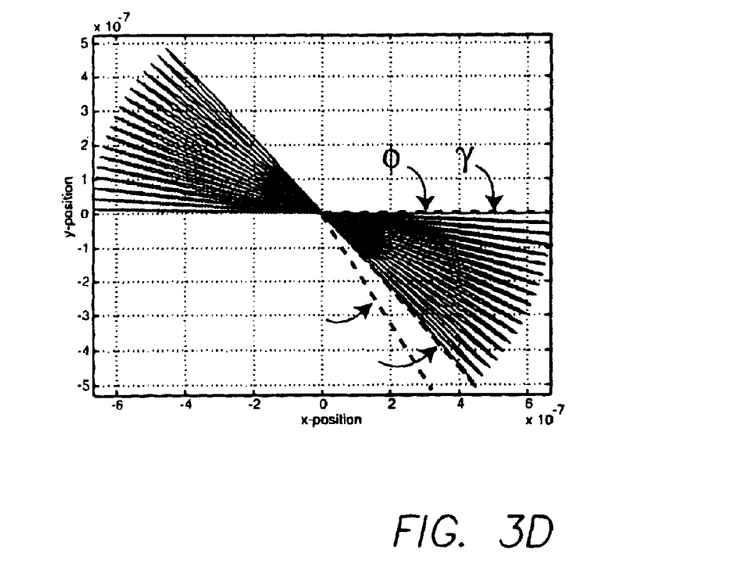

In the presence of linear anisoelasticities, the equations of motion appear as $$m\ddot{x}+k_{xx}x+k_{xy}y-2m\Omega\dot{y}=F_d$$

$$m\ddot{y}+k_{yy}y+k_{yx}x+2m\Omega\dot{x}=0 \quad (5)$$

where m is the lumped mass approximation for the gyroscope and $k_{xx}$, $k_{yy}$, $k_{xy}$, and $k_{yx}$ are the non-ideal stiffness terms (by symmetry $k_{xy}=k_{yx}$). A convenient way of expressing the non-idealities is in terms of the principal stiffness values $K_1$ and $K_2$ and the angular mismatch angle $\alpha$ of the principal axes of elasticity with the x-y coordinate system as shown in the comparison of an ideal gryo in FIG. 2a and an imperfect one in FIG. 2b. The non-idealities written in this form are $$k_{xx}=k_n+h \cos (2\alpha)$$

$$k_{yy}=k_n+h \cos (2\alpha)$$

$$k_{xy}=k_{yx}+h \sin (2\alpha) \quad (6)$$

where $2k_n=(K_1+K_2)$ and h is proportional to the stiffness mismatch between the principal axes, $2h=(K_1-K_2)$. Anisoelasticity has two possible effects on the performance of the system. Firstly, when errors are small (smallness defined as $h/k_n<<1$) the line oscillation precesses with developing undesirable ellipticity as depicted in FIG. 3a. This ellipticity enters in to calculations for angular rate and angle of rotation, causing bias and scaling errors. Since the errors are small, a feedback controller which drives ellipticity to zero can be implemented which won't interfere with the measurements as depicted in FIG. 3b. However, if errors are large, then the precession pattern without compensation is completely eliminated as depicted in FIG. 3b and any attempts at feedback interferes with the precession angle as shown in FIG. 3d.

The most commonly used method for eliminating the large errors to the region where a feedback control can be used is through post processing where errors are identified using exterior calibration equipment and laser trimming the imperfections. The entire process is costly and time consuming compared to the cost for the fabrication of the sensor. Thus, a more advantageous and cost effective method is to integrate error identification, trimming, and feedback control on the same chip.

Figure 4:
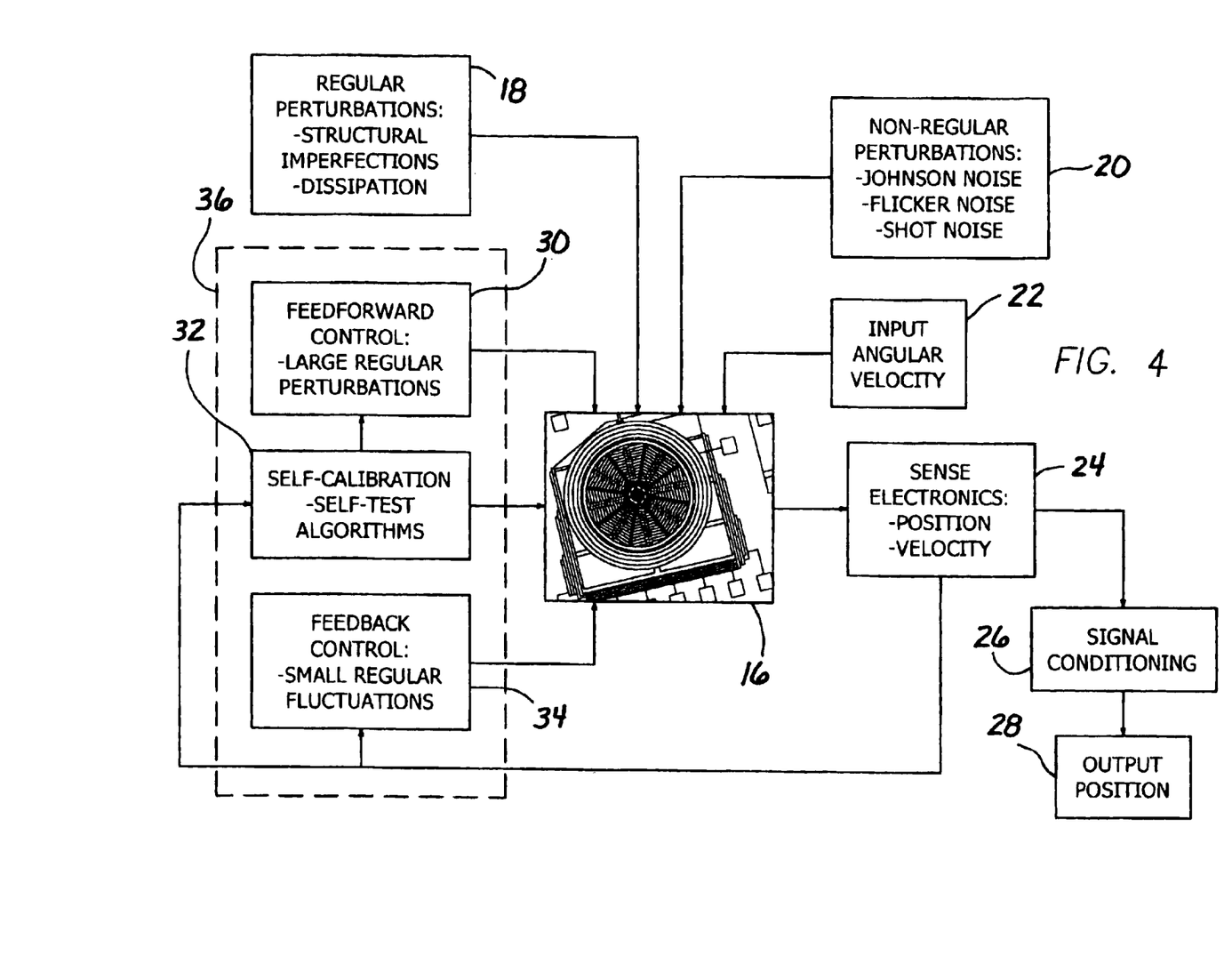

FIG. 4 is a block diagram showing the conceptual context of the invention. Gyro 16 is provided with a drive or input angular velocity by conventional drive 22. A conventional sensor 24 measures position and/or velocity of sense mass 12. The output signals are conditioned by conventional signal conditioning circuit 26 and provided as available output signals in a conventional output circuit 28, which may include a computer or other processing circuit. The influence of regular perturbations such as arising from structural imperfections or dissipation is dynamically represented by block 18. Nonregular perturbations influencing gyro 16, such as arising from Johnson noise, flicker noise and shot noise, is dynamically represented by block 20. The solution of the invention to the challenge of structural error suppression is the following:

1. A potentially on-chip multi-stage control architecture 36 illustrated in FIG. 4 comprises the following elements:

Self-calibration capabilities 32 for identifying structural errors 18 in gyro 16.

A feedforward control 30 coupled to gyro 16 which actively "trims" large structural imperfections based on the structural non-idealities parameters identified during the self-calibration test.

A feedback control 34 which eliminates small errors and in-run perturbations.
2. The Painter-Shkel Anisoelasticity Identification Algorithm (PS-AIA) for identifying structural imperfections based on the dynamic response of the system using principal component analysis (PCA) and Fourier transforms.
3. A method of implementing both the feedforward and feedback control using electrostatic parallel plates (not shown, but typically included within the structure of gyro 16).

Self-Calibration Algorithm Summary

Consider the algorithm developed for identifying errors based on the dynamic response of the system. Before describing the details of the algorithm, a summary is presented here:

1. The device is initially deflected or excited with an initial impulse response and allowed to freely oscillate. The x and y positions are recorded into arrays.
2. The statistical variances $s^2_x$ and $s^2_y$ and covariances $s_{xy}$ are calculated for the x and y deflections and the angle of misalignment $\alpha$ is calculated directly by $$\alpha = \tan^{-1}\left\{\frac{2s_{xy}}{s_x^2 - s_y^2 + \sqrt{(s_x^2 - s_y^2)^2 + 4s_{xy}^2}}\right\} \quad (7)$$

3. The x and y positions are transformed to decoupled positions $q_1$ and $q_2$ using the transform $q_1 = x \cos \alpha + y \sin \alpha$ $q_2 = -x \sin \alpha + y \cos \alpha \quad (8)$ 4. The frequency spectrum of the $q_1$ and $q_2$ positions are obtained by performing a Fast Fourier Transform (FFT) on the $q_1$ and $q_2$ positions. From here, the frequencies $\omega_{q1}$ and $\omega_{q2}$ corresponding to the highest deflections of $q_1$ and $q_2$, respectively, are obtained using a peak finding routine.
5. Anisoelasticity parameters h and $k_n$ are identified directly as $$h = \frac{m}{2}(\omega_{q1} - \omega_{q2}) \quad (9)$$

$$k_n = \frac{m}{2}(\omega_{q1} + \omega_{q2})$$

The following section presents details to justify the steps taken in the algorithm.

Self-Calibration Algorithm Principles

Substituting Equation (6) into Equation (5) and solving for x and y assuming no angular rotation ($\Omega=0$), no damping, no input force $F_d=0$, and an initial deflection of $x_0$ and $y_0$ yields $$\begin{Bmatrix} x \\ y \end{Bmatrix} = \begin{bmatrix} 1+\cos 2\alpha & \sin 2\alpha \\ \sin 2\alpha & 1-\cos 2\alpha \end{bmatrix} \begin{Bmatrix} x_0 \\ y_0 \end{Bmatrix} \cos\sqrt{\left(\omega_n^2 + \frac{h}{m}\right)} t + \begin{bmatrix} 1-\cos 2\alpha & -\sin 2\alpha \\ -\sin 2\alpha & 1+\cos 2\alpha \end{bmatrix} \begin{Bmatrix} x_0 \\ y_0 \end{Bmatrix} \cos\sqrt{\left(\omega_n^2 - \frac{h}{m}\right)} t \quad (10)$$

Figure 5A:
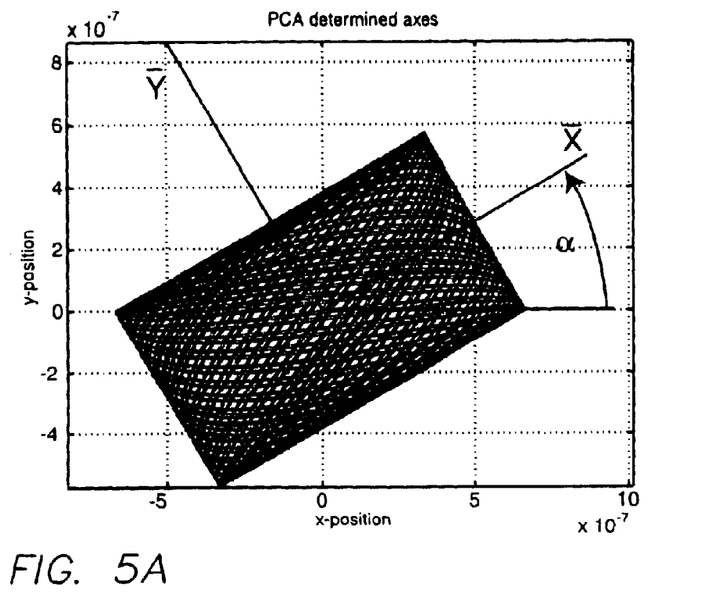
FIG. 5(a) is a graph of y position to x position in the absence of damping, where the trajectory of the gyroscope will form into elliptical type Lissajous figures. These figures will be bound by a rectangle oriented at an angle α. A Principal Component Analysis (PCA) is used to determine the principal axes of elasticity, designated as $\overline{X}$ and $\overline{Y}$.

We see that each position is comprised of the summation of two different sinusoidal functions due to the stiffness coupling. A plot of the time response of the system is a family of Lissajous figures as shown in FIG. 5a. Over time, it can be seen that the Lissajous figures will have trajectories bounded by a rectangle whose size is defined by h and which is oriented at the angle $\alpha$ from the coordinate axis. To determine the orientation of the principal axes, we employ the statistical method of principal component analysis (PCA). Here we will discuss the applications of PCA as it pertains to this study.

In our case, we have two variables of interest, the x position and y position. Now consider a 2×1 vector V=(x, y). We will assume that x and y have zero mean (centered about the origin) and that we have experimentally acquired covariances between x and y. A covariance matrix S can be expressed by $$S = \begin{bmatrix} s_x^2 & s_{xy} \\ s_{xy} & s_y^2 \end{bmatrix} \quad (11)$$

where $s^2_x$ and $s^2_y$ are the variances of x and y and the covariance between x and y is $$s_{xy} = \frac{n\sum_{k=1}^{n} x_k y_k - \sum_{k=1}^{n} x_k \sum_{k=1}^{n} y_k}{[n(n-1)]} \quad (12)$$

with the index of summation, k, going over the entire sample size, n. The covariance matrix is a numerical measure of the coupling between variables and in the case when S is diagonal, the vectors of V are uncorrelated, i.e. the x position has no influence on the y position.

Notice, when there is coupling through the stiffness matrix between the x and y position, the covariance matrix will also have coupling. Thus, a transformation that diagonalizes the covariance matrix will also diagonalize the stiffness matrix.

We now introduce a coordinate transformation $\zeta = U^T V$ where U is a constant matrix of transformation. It can be shown that there exists such an orthogonal transformation U such that the covariance matrix $\tilde{S}$ of this new coordinate system is $$\tilde{S}E(\zeta\zeta^T) = U^T S U \quad (13)$$

We will assume that the transformation U is a unity gain rotation and so $U^T = U^{-1}$. With this assumption, we see that by choosing the columns of U to be the eigenvectors ($e_1$ and $e_2$) of the covariance matrix, we will achieve a diagonal form, thus the eigenvectors designate the basis vectors for the uncoupled space. Since S is Grammian, we are guaranteed that these eigenvectors are orthogonal. From Equation (6), we can see that a rotation transformation of the form $$\begin{Bmatrix} x \\ y \end{Bmatrix} = \begin{bmatrix} \cos\alpha & -\sin\alpha \\ \sin\alpha & \cos\alpha \end{bmatrix} \begin{Bmatrix} q_1 \\ q_2 \end{Bmatrix} \quad (14)$$

will uncouple the dynamic system to the uncorrelated principal axis coordinate system. It is necessary that this transformation must be equivalent to $U^T$ and so one expression for the eigenvectors representing the principal axes is as depicted in FIG. 5a $e_1 = (\cos \alpha)\hat{e}_x - (\sin \alpha)\hat{e}_y$ $e_2 = (\sin \alpha)\hat{e}_x - (\cos \alpha)\hat{e}_y \quad (15)$ We then directly calculate the angle α from the second eigenvector $$\alpha = \tan^{-1}\left(\frac{e_{2,x}}{e_{2,y}}\right) \quad (16)$$

where $e_{2,x}$ and $e_{2,y}$ are the x and y components of the second eigenvector. Based on the dynamic system in Equation (10), if we restrict the initial conditions to only an x deflection ($y_0=0$), then we are guaranteed of the system oscillating within a rectangle oriented in the boundary $\pi/4 > \alpha > -\pi/4$. Taking a Fourier transform of Equation (10) while considering only the x position yields $$X(\omega) = \frac{1}{2}(G(\alpha) + x_0)\pi\delta(\omega - \omega_1) + \quad (17)$$
$$\frac{1}{2}(G(\alpha) - x_0)\pi\delta(\omega - \omega_2)$$
$$\omega_1^2 = \omega_n^2 + \frac{h}{m}$$
$$\omega_2^2 = \omega_n^2 - \frac{h}{m}$$

From Equation (17), assuming the initial y deflection is zero, the ratio of the amplitudes of the two frequency components are $$\left|\frac{X(\omega_1)}{X(\omega_2)}\right| = x_0 \frac{\cos(2\alpha) + 1}{\cos(2\alpha) - 1} \quad (18)$$

Figure 5B:
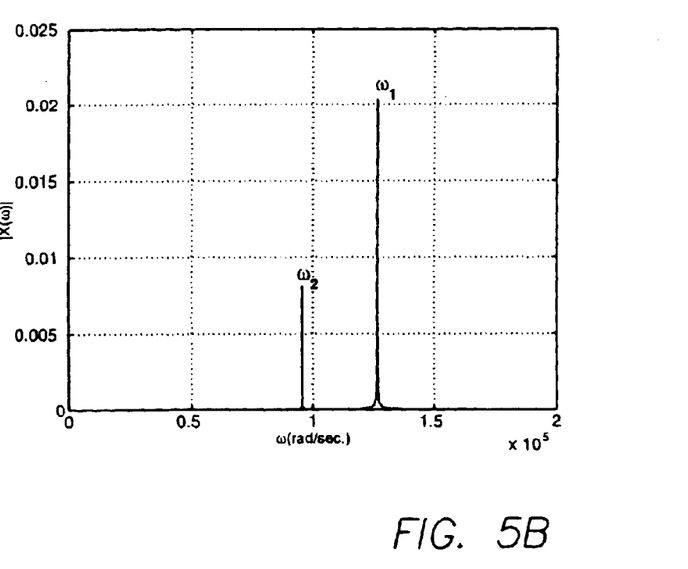
FIG. 5(b) is a graph of the Fourier transform of the x component of the data reveals two peaks due to on diagonal coupling of the stiffness matrix. From this plot, the h parameter of the system can be extracted as $2h = m(\omega^2_1 - \omega^2_2)$ where $\omega_1$ and $\omega_2$ correspond to the frequencies of the maximum and second maximum peaks, respectively.

In this case, the highest peak in the frequency plot corresponds to the $\omega_1$ term and the second highest peak corresponds to $\omega_2$ term as shown in FIG. 5b. Parameter h and the ideal isotropic stiffness $k_n$ are calculated as $2h=m(\omega^2_1-\omega^2_2)$ and $2k_n=(\omega^2_1+\omega^2_2)$, respectively. If $\omega_1<\omega_2$, then $h<0$. The algorithm for determining h and $k_n$ is dependent on differentiating the two peaks in the X frequency domain. As the errors tend to grow smaller, it becomes impossible to distinguish the two peaks and any numerical peak finding algorithm may result in erroneous results.

A more accurate method for determining h and $k_n$ requires the calculated α from the PCA analysis. Using the transformation from Equation (14), the equations in the transformed principal coordinate space are $q_1(t) = (2x_0 \cos \alpha + 2y_0 \sin \alpha) \cos \omega_{q1} t$ $q_2(t) = (-2x_0 \sin \alpha + 2y_0 \cos \alpha) \cos \omega_{q2} t \quad (19)$ Thus, if we transform our data in this way and then take the Fourier transform, we see that there will be one peak for $q_1$ and $q_2$ at frequencies $\omega_{q1}$ and $\omega_{q2}$, respectively. These frequencies are $$\omega_{q1}^2 = \omega_n^2 + \frac{h}{m} \quad (20)$$
$$\omega_{q2}^2 = \omega_n^2 - \frac{h}{m}$$

Then, h and $k_n$ are calculated simply as $2h=m(\omega^2_{q1}-\omega^2_{q2})$ and $2k_n=m(\omega^2_{q1}+\omega^2_{q2})$, respectively. This result makes it easier to identify smaller errors since it is only necessary to identify the largest peak in each frequency spectrum rather than the largest two.

The benefits of this algorithm is since the PCA and Fourier transforms take advantage of all the data, it is not necessary to have precise deflection information. This is especially advantageous in systems where small deflections are difficult to resolve due to noise in the sensing electronics. One of the shortcomings of this algorithm is that systems with high damping reduce the amount of data points, resulting in erroneous results. A solution to highly damped systems is vacuum packaging of the device and also to employ an energy compensating controller.

Feedforward Control

The second part of the controller is the feedforward portion which "trims" large anisoelasticity to the order where a feedback control can compensate successfully. The gains of the control architecture are chosen based on the results from the self-calibration test. In general, the feedforward control would seek to make a constant change in the stiffness. There are two popular mechanisms for accomplishing this in MEMS. The first is thermal tuning where the suspension members of the device can be pre-stressed under Joule heating, causing a change in stiffness. Another mechanism is electrostatic tuning where the nonlinear "negative spring" effect inherent in electrostatic parallel plates is used to change the stiffness. As electrostatic actuation is commonly used in MEMS inertial sensors, this is what we have used as a basis for the feedforward control realization.

Electrostatic "Trimming"

Figure 6:
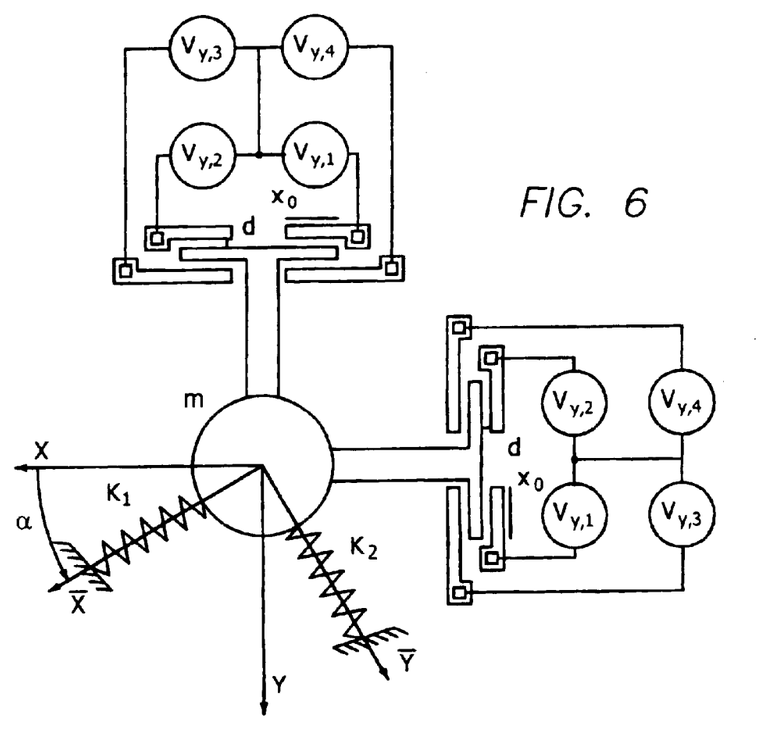
FIG. 6 is a schematic of one realization of the feedforward portion of the control is through electronic trimming using the "negative spring" effects of nonlinear electrostatic parallel plates.

Since all vibratory gyroscope utilize electrostatic actuation and specifically, all rate integrating gyroscopes utilize parallel plate electrostatic actuation, for drive and sense, we focus on using the nonlinear "negative spring" effect inherent in parallel plate actuation to tune out the non-ideal components of the stiffness matrix as depicted in FIG. 6. The non-ideal dynamics of the gyroscope, including the electrostatics, can be expressed by $m\ddot{x}+(k_n+h \cos 2\alpha)x+(h \sin 2\alpha)y=F_{e,x}$ $m\ddot{y}+(h \sin 2\alpha)x+(k_n-h \cos 2\alpha)y=F_{e,y} \quad (21)$ where $F_{e,x}$ and $F_{e,y}$ are electrostatic forces expressed as $$\frac{2F_{e,x}}{e_0 t} = \frac{g-Nj}{(d-i)^2}V_{i,1}^2 + \frac{g+Nj}{(d-i)^2}V_{i,2}^2 -$$
$$\frac{g-Nj}{(d+i)^2}V_{i,3}^2 - \frac{g+Nj}{(d+i)^2}V_{i,4}^2 +$$
$$\frac{N}{d-j}V_{j,1}^2 - \frac{N}{d-j}V_{j,2}^2 -$$
$$\frac{N}{d+j}V_{j,3}^2 + \frac{N}{d+j}V_{j,4}^2$$

Here $i=\{x, y\}$, $j=\{y, x\}$, N is the number of control electrode sets (e.g., in FIG. 6, N=1), t is the structural thickness, d is the parallel plate gap, g is the total plate overlap ($g=Nx_0=Ny_0$), and $\epsilon_0$ is the permittivity of a vacuum. For structural compensation, we use the following control voltages $V_{x,1}=V_{DC}+v_{xx}+v_q+v_x V_{x,2}=V_{DC}+v_{xx}-v_q+v_x$ $V_{x,3}=V_{DC}+v_{xx}+v_q+v_x V_{x,4}=V_{DC}+v_{xx}-v_q+v_x$ $V_{y,1}=V_{DC}+v_{yy}+v_q+v_y V_{y,2}=V_{DC}+v_{yy}-v_q+v_y$ $V_{y,3}=V_{DC}+v_{yy}+v_q+v_y V_{y,4}=V_{DC}+v_{yy}-v_q+v_y$ where $V_{DC}$ is a constant bias voltage, $v_q$ is a constant feedforward misalignment control voltage, $v_{xx}$ and $v_{yy}$ are constant stiffness mismatch control voltages, and $v_x$ and $v_y$ are state dependent feedback control voltages. We determine the voltages for the feedforward control by first assuming zero feedback ($v_x=v_y=0$). The non-linearity of the parallel plates leads to a non-zero first derivative of the electrostatic force with respect to position, which can be interpreted as an electrostatic spring, contributing to the overall system stiffness. Additionally, the net forces and moments are zero, so the stiffness can be tuned without deflecting the structure. In order to find a closed-form approximation for the control voltages, we assume small deflections and combine the ideal ($K_i$), non-ideal ($K_n$), and electrostatic ($K_e$) matrix contributions together to form the overall stiffness realization $$K = K_i + K_n + K_e \tag{22}$$

$$K_i = \begin{bmatrix} k_n & 0 \\ 0 & k_u \end{bmatrix}$$

$$K_n = \begin{bmatrix} h\cos(2\alpha) & h\sin(2\alpha) \\ h\sin(2\alpha) & -h\cos(2\alpha) \end{bmatrix}$$

$$K_e = \frac{4e_0 t}{d^2} \begin{bmatrix} \Phi_1 & \Phi_2 \\ \Phi_2 & \Phi_3 \end{bmatrix}$$

$$\Phi_1 = \frac{g}{d}((V_{DC} + v_{xx})^2 + v_q^2)$$

$$\Phi_2 = v_q((V_{DC} + v_{xx}) + (V_{DC} + v_{yy}))$$

$$\Phi_3 = \frac{g}{d}((V_{DC} + v_{yy})^2 + v_q^2)$$

With any arbitrary DC voltage, there exists different sets of control voltages $v_q$, $v_{xx}$, and $v_{yy}$ to cancel the on-diagonal terms of the stiffness matrix and set the on-diagonal stiffness terms equal to each other ($k_{tuned}$). Setting the on-diagonal terms equal to zero leads to the following constraint on the misalignment control voltage $v_q$ $$v_q = \frac{-1}{4} \frac{hd^2 \sin 2\alpha}{e_0 tN((V_{DC} + v_{xx}) + (V_{DC} + v_{yy}))} \tag{23}$$

There are several ways of choosing $v_{xx}$ and $v_{yy}$, which are constrained by the fact that the on-diagonal terms must be identical and that voltage values must be real. One way is to set the voltage which influences the smallest of the on-diagonal stiffness terms equal to zero and use the second voltage to tune the larger stiffness term to match. This gives the following set of control voltages for $h \cos 2\alpha \geq 0$ $$v_{xx} = -V_{DC} + \left| \sqrt{V_{DC}^2 + \frac{hd^3 \cos 2\alpha}{2e_0 tg}} \right| \tag{24}$$

$$v_{yy} = 0$$

and for $h \cos 2\alpha \leq 0$ $$v_{xx} = 0 \tag{25}$$

$$v_{yy} = -V_{DC} + \left| \sqrt{V_{DC}^2 - \frac{hd^3 \cos 2\alpha}{2e_0 tg}} \right|$$

Because the on-diagonal electrostatic stiffness term is always negative, the tuned on-diagonal stiffness value $k_{tuned}$ will always be less than the original ideal stiffness ($k_{tuned} < k_n$). To take this into account, a good strategy is to design the gyroscope suspension to be stiffer than desired. A theoretical limit is reached when these stiffness terms become negative ($k_{tuned} < 0$) and the system becomes unstable. Thus, an optimal DC bias voltage is one that maximizes the trace of the stiffness matrix subject to the constraint that $v_q$, $v_{xx}$ and $v_{yy}$ must satisfy (23) and (24)/(25). A closed form solution is not readily available for this voltage, and must be solved for numerically. Even with an optimal choice for voltages, invariably a practical limit is reached where errors cannot be compensated for without resulting in system instability. This occurs when the compensated on-diagonal terms are less than or equal to zero.

Feedback Control

The final portion of the controller is a feedback control which compensates for small errors not picked up by the self-calibration and in-run perturbations that arise during operation. Under the assumptions that the errors are small, the feedback control seeks to drive undesirable ellipticity with the form $$\begin{Bmatrix} F_x \\ F_y \end{Bmatrix} = -\gamma_1 \cdot P \cdot S^T \cdot \begin{Bmatrix} x \\ y \end{Bmatrix} \tag{26}$$

where $y_1$ is a constant gain, S is a unity gain 2×2 skew symmetric matrix, and P is angular momentum (angular momentum is zero when the ellipticity is zero) defined as $$P = (x\dot{y} - y\dot{x}) \tag{27}$$

As an illustration of applying this control in a realistic context, we again use the example of a device using electrostatic parallel plates. Carrying through the variables from above, we implement state dependent control voltages $v_x$ and $v_y$ $$v_x = \frac{d^2(Ndv_q F_y + F_x g(V_{DC} + v_{xx}))}{4\epsilon_0 t(g^2(V_{DC} + v_{xx})(V_{DC} + v_{yy}) - N^2 d^2 v_q^2)} \tag{28}$$

$$v_y = \frac{d^2(Ndv_q F_x + F_y g(V_{DC} + v_{yy}))}{4\epsilon_0 t(g^2(V_{DC} + v_{xx})(V_{DC} + v_{yy}) - N^2 d^2 v_q^2)}$$

where $F_x$ and $F_y$ are the control forces based on the skew symmetric control architecture given in (26). This architecture is guaranteed of compensating for small perturbations without interfering with the Coriolis induced precession.

With the addition of the feedforward control voltages, the complete dual stage architecture is capable of "trimming" large structural imperfections while compensating for small perturbations.

Simulation of Complete Control System

Figure 7A:
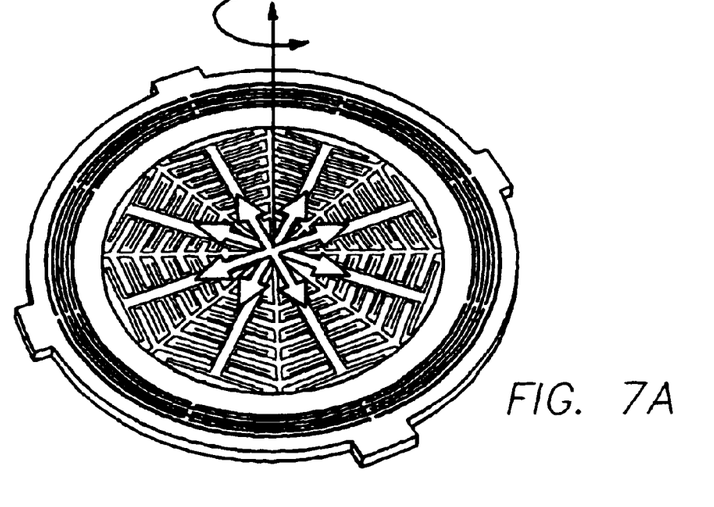
Figure 7B:
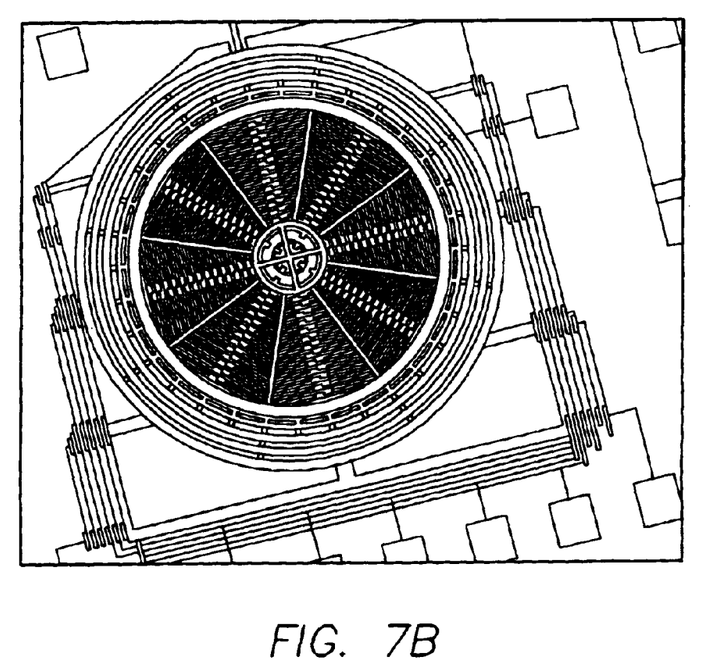
FIG. 7(b) is a microphotograph of the actual device of FIG. 7(a).
Figure 8A:
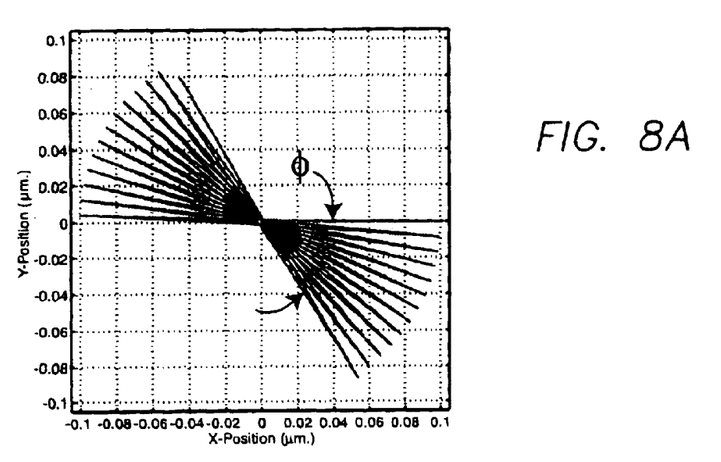
Figure 8B:
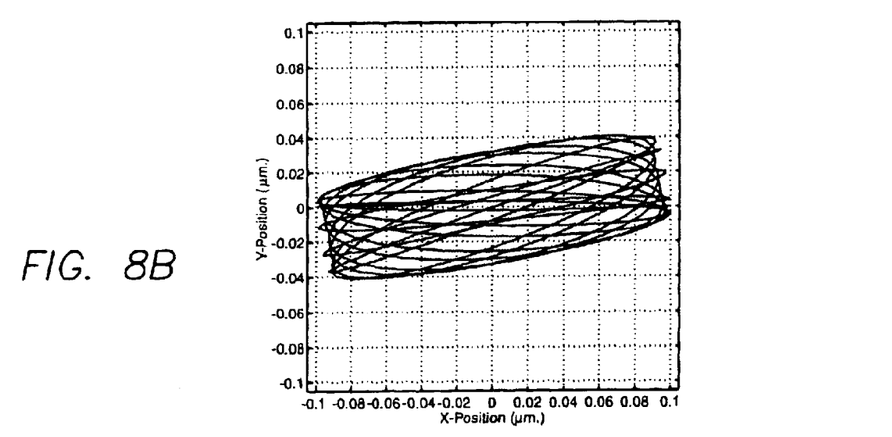
FIG. 8(b) shows that large anisoelasticities due to fabrication imperfections interfere with the ideal operation of the device, eliminating the precession.
Figure 8C:
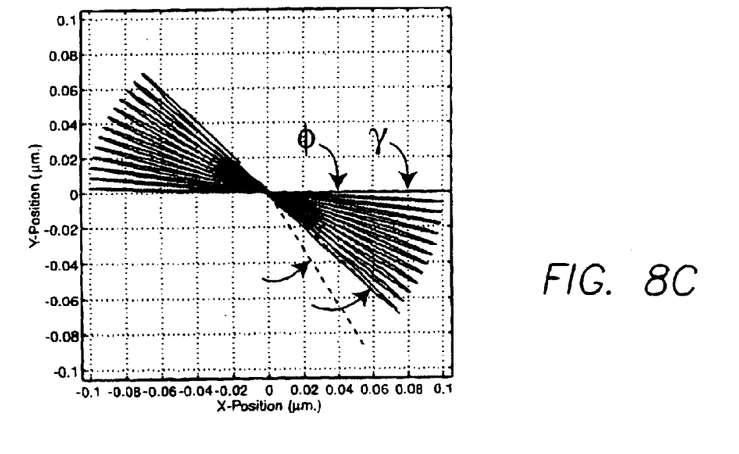
FIG. 8(c) demonstrates that the feedback control used to compensate for these large imperfections also interferes with the precession pattern, reducing the precession angle from the ideal angle φ to y.

An existing rate integrating gyroscope design as shown in FIG. 7a is used as a test bed to demonstrate the performance of the control architecture. The demonstrate feasibility of the multi stage control system, simulations are run using parameters realistic implementation of a surface micromachined rate integrating gyroscope as shown in FIG. 7b. The mass of the device is $4.10 \times 10^{-10}$ kg and the isotropic stiffness $k_n$ is 1.55 N/m, giving a natural frequency of 9.8 kHz for the system. The total parallel plate overlap g is 1200 $\mu$m, the parallel plate gap d is 2 microns, and the permittivity $\epsilon_0$ is $8.854 \times 10^{-12}$ F/m. The simulations based on the non-linear equations of motion (21) are run for 10 ms, assuming an initial x deflection of 0.1 microns to satisfy the small deflection assumption. For a chosen set of large structural anisoelasticities ($h/k_n = 10\%$, $\alpha = 100$), an optimal DC bias voltage which maximizes the trace of the stiffness matrix is calculated to be 4.20 V, which will remain constant for each simulation presented here. Under this bias voltage and in the absence of imperfections (h=0, $\alpha$=0), the line of oscillation precesses by an angle $\phi$ as shown in FIG. 8a. With large structural anisoelasticities ($h/k_n = 10\%$, $\alpha = 10°$) and without compensation ($v_q = v_{xx} = v_{yy} = v_x = v_y = 0$), the system oscillates about the principal axes of elasticity and there is no precession as shown in FIG. 8b. A purely feedback control using control voltages $v_x$ and $v_y$ as calculated from (28) is then attempted, which eliminates the quadrature error, but also interferes with the precession angle as shown in FIG. 8c.

Figure 8D:
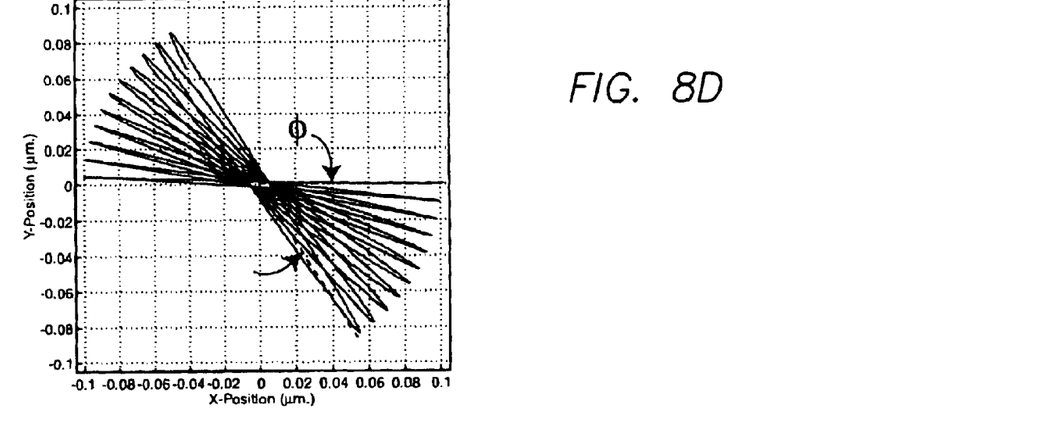
FIG. 8(d) shows that by using a feedforward control, large structural anisoelasticities can be eliminated while maintaining the ideal precession of the device.

Next, appropriate compensating feedforward control voltages $v_q$, $v_{xx}$, $v_{yy}$ are chosen based on the assumption that a and h are well known. The purely feedforward control ($v_x=v_y=0$) is used to eliminate the quadrature error, which restores ideal precession of the line of oscillation as shown in FIG. 8d.

Figure 8E:
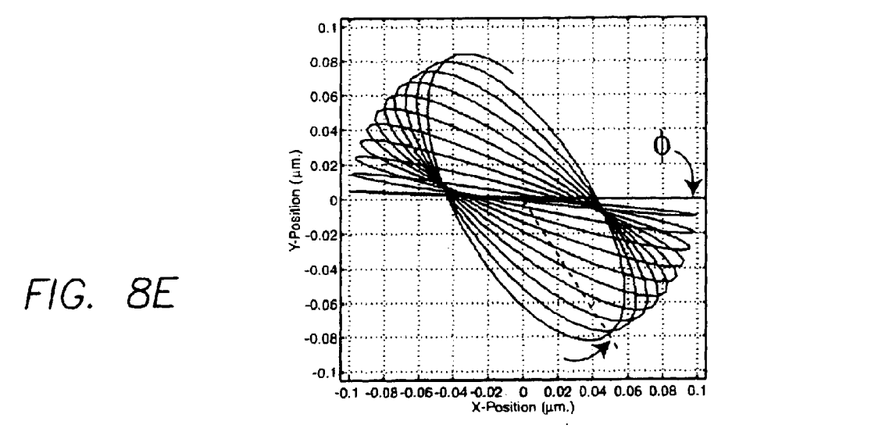
FIG. 8(e) shows that while the feedforward control can compensate for constant structural imperfections, it is invariant to small perturbation that arise during normal operation of the device (e.g., due to thermal fluctuations), which disrupt the line of oscillation.
Figure 8F:
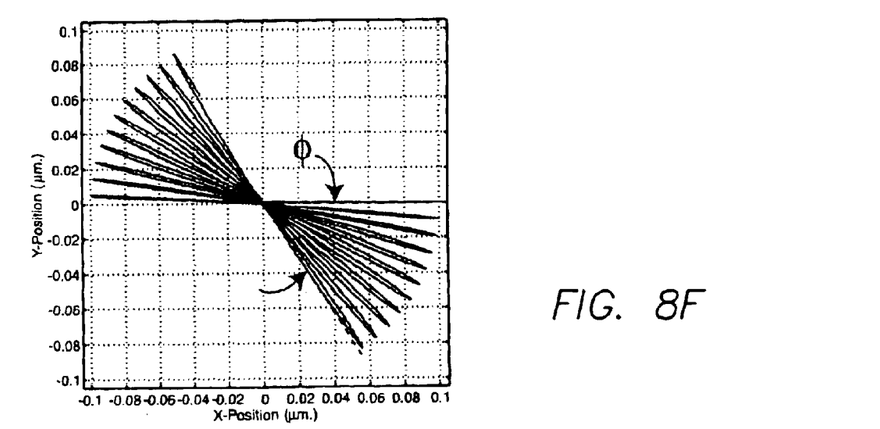
FIG. 8(f) shows that a dual-stage feedforward/feedback architecture can compensate for both structural imperfections and small perturbations without interfering with the precession.

However, based on simulation of the PCA and Fourier anisoelasticity finding algorithms above, the anisoelasticity parameters are actually calculated to be $(h/k_n)_{calc}=10.23\%$, $\alpha_{calc}=10.16°$. To realize the effects of this error, as well as other small perturbations that could arise during normal operation, we add small anisoelasticities ($h_2/k_n=1\%$) to the system that cannot be compensated for by the feedforward control. This results in destruction of the precession pattern shown in FIG. 8e. The state dependent voltages are then included to compensate for these perturbations while still allowing the undisturbed precession pattern as in FIG. 8f, where the precession angle is the same as (a) and (f).

Many alterations and modifications may be made by those having ordinary skill in the art without departing from the spirit and scope of the invention. Therefore, it must be understood that the illustrated embodiment has been set forth only for the purposes of example and that it should not be taken as limiting the invention as defined by the following claims. For example, notwithstanding the fact that the elements of a claim are set forth below in a certain combination, it must be expressly understood that the invention includes other combinations of fewer, more or different elements, which are disclosed in above even when not initially claimed in such combinations.

The words used in this specification to describe the invention and its various embodiments are to be understood not only in the sense of their commonly defined meanings, but to include by special definition in this specification structure, material or acts beyond the scope of the commonly defined meanings. Thus if an element can be understood in the context of this specification as including more than one meaning, then its use in a claim must be understood as being generic to all possible meanings supported by the specification and by the word itself.

The definitions of the words or elements of the following claims are, therefore, defined in this specification to include not only the combination of elements which are literally set forth, but all equivalent structure, material or acts for performing substantially the same function in substantially the same way to obtain substantially the same result. In this sense it is therefore contemplated that an equivalent substitution of two or more elements may be made for any one of the elements in the claims below or that a single element may be substituted for two or more elements in a claim. Although elements may be described above as acting in certain combinations and even initially claimed as such, it is to be expressly understood that one or more elements from a claimed combination can in some cases be excised from the combination and that the claimed combination may be directed to a subcombination or variation of a subcombination.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The claims are thus to be understood to include what is specifically illustrated and described above, what is conceptionally equivalent, what can be obviously substituted and also what essentially incorporates the essential idea of the invention.

We claim:

1. A method for error suppression in a micromachined gyroscope comprising:

self-calibrating the gyroscope to identify structural errors based on the dynamic response of the system;

actively trimming the gyroscope by using feedforward control in response to large structural imperfections based on the structural errors identified during the self-calibration; and correcting for small errors and in-run perturbations in the gyroscope arising from structural errors and that occur in the gyroscope by feedback control.

2. The method of claim 1 where self-calibrating the gyroscope to identify structural errors based on the dynamic response of the system comprises using principal component analysis (PCA) and Fourier transforms to make the identification.

3. The method of claim 1 where eliminating small errors and in-run perturbations in the gyroscope by feedback control comprises compensating for small perturbations without interfering with the Coriolis induced precession.

4. A method for error suppression in a micromachined gyroscope comprising:

self-calibrating the gyroscope to identify structural error based on the dynamic response of the system;

actively trimming the gyroscope by using feedforward control in response to large structural imperfections based on the structural errors identified during the self-calibration; and eliminating small errors and in-run perturbations in the gyroscope by feedback control, where actively trimming the gyroscope comprises using electrostatic parallel plates to apply a feedforward error suppression signal to the gyroscope.

5. The method of claim 4 where eliminating small errors and in-run perturbations in the gyroscope comprises using electrostatic parallel plates to apply a feedback error suppression signal to the gyroscope.

6. A method for error suppression in a micromachined gyroscope comprising:

self-calibrating the gyroscope to identify structural errors based on the dynamic response of the system;

actively trimming the gyroscope by using feedforward control in response to large structural imperfections based on the structural errors identified during the self-calibration; and eliminating small errors and in-run perturbations in the gyroscope by feedback control, where eliminating small errors and in-run perturbations in the gyroscope comprises using electrostatic parallel plates to apply a feedback error suppression signal to the gyroscope.

7. A method for error suppression in a micromachined gyroscope comprising:

self-calibrating the gyroscope to identify structural errors based on the dynamic response of the system;

actively trimming the gyroscope by using feedforward control in response to large structural imperfections based on the structural errors identified during the self-calibration; and eliminating small errors and in-run perturbations in the gyroscope by feedback control, where self-calibrating the gyroscope to identify structural errors based on the dynamic response of the system comprises:

exciting the gyroscope with an initial impulse response an allowing it to freely oscillate;

recording the x and y deflections of a sensing mass in the gyroscope;

determining statistical variances $s^2_x$ and $s^2_y$ and covariances $s_{xy}$ for the x and y deflections and an angle of misalignment $\alpha$ by $$\alpha = \tan^{-1}\left\{\frac{2s_{xy}}{s_x^2 - s_y^2 + \sqrt{(s_x^2 - s_y^2)^2 + 4s_{xy}^2}}\right\}$$

transforming the x and y deflections to decoupled positions $q_1$ and $q_2$ using the transform $q_1 = x \cos \alpha + y \sin \alpha$ $q_2 = -x \sin \alpha + y \cos \alpha$ obtaining a frequency spectrum of the $q_1$ and $q_2$ positions by Fourier transforms;

determining frequencies $\omega_{q1}$ and $\omega_{q2}$ corresponding the highest deflections of $q_1$ and $q_2$ respectively, using a peak finding routine; and identifying anisoelasticity parameters h and $k_n$ as $$h = \frac{m}{2}(\omega_{q1} - \omega_{q2})$$

$$k_n = \frac{m}{2}(\omega_{q1} + \omega_{q2}).$$

8. A method for error suppression in a micromachined gyroscope comprising:
self-calibrating the gyroscope to identify structural errors based on the dynamic response of the system;
actively trimming the gyroscope by using feedforward control in response to large structural imperfections based on the structural errors identified during the self-calibration; and
eliminating small errors and in-run perturbations in the gyroscope by feedback control,
where actively trimming the gyroscope by using feedforward control comprises trimming large anisoelasticity of the stiffness of the gyroscope to an order where feedback control can compensate therefore.

9. The method of claim 8 where trimming comprises making a constant change in the stiffness based structural errors identified by self-calibrating the gyroscope.

10. The method of claim 8 where trimming comprises electrostatic tuning using a nonlinear negative spring effect inherent in electrostatic parallel plates to change the stiffness.

11. The method of claim 8 where the gyroscope is characterized by a stiffness matrix K=Ki+Kn+Ke, where (Ki) is the contribution from an ideal gyroscope, (Kn) is the contribution from a non-ideal gyroscope, and (Ke) is the contribution from an electrostatic negative spring, and where trimming comprises applying electrostatic control voltages which maximize the trace of the Stiffness matrix, K.

12. A method for error suppression in a micromachined gyroscope comprising:
self-calibrating the gyroscope to identify structural error based on the dynamic response of the system;
actively trimming the gyroscope by using feedforward control in response to large structural imperfections based on the structural errors identified during the self-calibration; and
eliminating small errors and in-run perturbations in the gyroscope by feedback control,
where eliminating small errors and in-run perturbations in the gyroscope by feedback control comprises compensating for small perturbations without interfering with the Coriolis induced precession,
where compensating for small perturbations without interfering with the Coriolis induced precession comprises driving undesirable ellipticity with the form $$\left\{\begin{matrix}F_x \\ F_y\end{matrix}\right\} = -\gamma_1 \cdot P \cdot S^T \cdot \left\{\begin{matrix}x \\ y\end{matrix}\right\}$$

where $F_x$ and $F_y$ are the driving forces in the x and y directions respectively, x and y are the planar positions of the driven mass of the gyroscope, $y_1$ is a constant gain, S is a unity gain 2×2 skew symmetric matrix, and P is angular momentum defined as $P = (x\dot{y} - y\dot{x})$.

13. An apparatus for error suppression in a micromachined gyroscope comprising:
means for self-calibrating the gyroscope to identify structural errors based on the dynamic response of the system;
means for actively trimming the gyroscope by using feedforward control in response to large structural imperfections based on the structural errors identified during the self-calibration; and
means for correcting for small errors and in-run perturbations in the gyroscope by feedback control.

14. The apparatus of claim 13 where the means for self-calibrating the gyroscope to identify structural errors based on the dynamic response of the system comprises means for making the identification using principal component analysis (PCA) and Fourier transforms.

15. The apparatus of claim 13 where the means for eliminating small errors and in-run perturbations in the gyroscope by feedback control comprises means for compensating for small perturbations without interfering with the Coriolis induced precession.

16. An apparatus for error suppression in a micromachined gyroscope comprising:
means for self-calibrating the gyroscope to identify structural errors based on the dynamic response of the system;
means for actively trimming the gyroscope by using feedforward control in response to large structural imperfections based on the structural errors identified during the self-calibration; and
means for eliminating small errors and in-run perturbations in the gyroscope by feedback control,
where the means for actively trimming the gyroscope comprises electrostatic parallel plates and means for applying a feedforward error suppression signal to the electrostatic parallel plates.

17. The apparatus of claim 16 where the means for eliminating small errors and in-run perturbations in the gyroscope comprises means for applying a feedback error suppression signal to the electrostatic parallel plates.

18. An apparatus for error suppression in a micromachined gyroscope comprising:
means for self-calibrating the gyroscope to identify structural errors based on the dynamic response of the system;
means for actively trimming the gyroscope by using feedforward control in response to large structural imperfections based on the structural errors identified during the self-calibration; and means for eliminating small errors and in-run perturbations in the gyroscope by feedback control, where the means for eliminating small errors and in-run perturbations in the gyroscope comprises means for applying a feedback error suppression signal to the electrostatic parallel plates.

19. An apparatus for error suppression in a micromachined gyroscope comprising:

means for self-calibrating the gyroscope to identify structural errors based on the dynamic response of the system;

means for actively trimming the gyroscope by using feedforward control in response to large structural imperfections based on the structural errors identified during the self-calibration; and means for eliminating small errors and in-run perturbations in the gyroscope by feedback control, where the means for self-calibrating the gyroscope to identify structural errors based on the dynamic response of the system comprises:

means for exciting the gyroscope with an initial impulse response and allowing it to freely oscillate;

means for recording the x and y deflections of a sensing mass in the gyroscope;

means for determining statistical variances $s^2_x$ and $s^2_y$ and covariances $s_{xy}$ for the x and y deflections and an angle of misalignment $\alpha$ by $$\alpha = \tan^{-1}\left\{\frac{2s_{xy}}{s_x^2 - s_y^2 + \sqrt{(s_x^2 - s_y^2)^2 + 4s_{xy}^2}}\right\}$$

means for transforming the x and y deflections to decoupled positions $q_1$ and $q_2$ using the transform $q_1 = x \cos \alpha + y \sin \alpha$ $q_2 = -x \sin \alpha + y \cos \alpha$ means for obtaining a frequency spectrum of the $q_1$ and $q_2$ positions by Fourier transforms;

means for determining frequencies $\omega_{q1}$ and $\omega_{q2}$ corresponding to the highest deflections of $q_1$ and $q_2$, respectively, using a peak finding routine; and means for identifying anisoelasticity parameters h and kn a $$h = \frac{m}{2}(\omega_{q1} - \omega_{q2})$$

$$k_n = \frac{m}{2}(\omega_{q1} + \omega_{q2}).$$

20. An apparatus for error suppression in a micromachined gyroscope comprising:

means for self-calibrating the gyroscope to identify structural errors based on the dynamic response of the system;

means for actively trimming the gyroscope by using feedforward control in response to large structural imperfections based on the structural errors identified during the self-calibration; and means for eliminating small errors and in-run perturbations in the gyroscope by feedback control, where the means for actively trimming the gyroscope by using feedforward control comprises means for trimming large anisoelasticity of the stiffness of the gyroscope to an order where feedback control can compensate therefore.

21. The apparatus of claim 20 where the means for trimming comprises means for making a constant change in the stiffness based structural errors identified by self-calibrating the gyroscope.

22. The apparatus of claim 20 where the means for trimming comprises means for electrostatic tuning using a nonlinear negative spring effect inherent in electrostatic parallel plates to change the stiffness.

23. The apparatus of claim 20 where the gyroscope is characterized by a stiffness matrix K=Ki+Kn+Ke, where (Ki) is the contribution from an ideal gyroscope, (Kn) is the contribution from a non-ideal gyroscope, and (Ke) is the contribution from an electrostatic negative spring, and where the means for trimming comprises means for applying electrostatic control voltages which maximize the trace of the stiffness matrix, K.

24. An apparatus for error suppression in a micromachined gyroscope comprising:

means for self-calibrating the gyroscope to identify structural errors based on the dynamic response of the system;

means for actively trimming the gyroscope by using feedforward control in response to large structural imperfections based on the structural errors identified during the self-calibration; and means for eliminating small errors and in-run perturbations in the gyroscope by feedback control, where the means for eliminating small errors and in-run perturbations in the gyroscope by feedback control comprises means for compensating for small perturbations without interfering with the Coriolis induced precession, where the means for compensating for small perturbations without interfering with the Coriolis induced precession comprises means for driving undesirable ellipticity with the form $$\begin{Bmatrix} F_x \\ F_y \end{Bmatrix} = -\gamma_1 \cdot P \cdot S^T \cdot \begin{Bmatrix} x \\ y \end{Bmatrix}$$

where $F_x$ and $F_y$ are the driving forces in the x and y directions respectively, x and y are the planar positions of the driven mass of the gyroscope, $y_1$ is a constant gain, S is a unity gain 2×2 skew symmetric matrix, an P is angular momentum defined as $P = (x\dot{y} - y\dot{x})$.

* * * * *